July 22, 1958
E. E. MUEHLNER
2,844,220
BLADED BRAKING APPARATUS
Filed Dec. 6, 1955
2 Sheets-Sheet 1
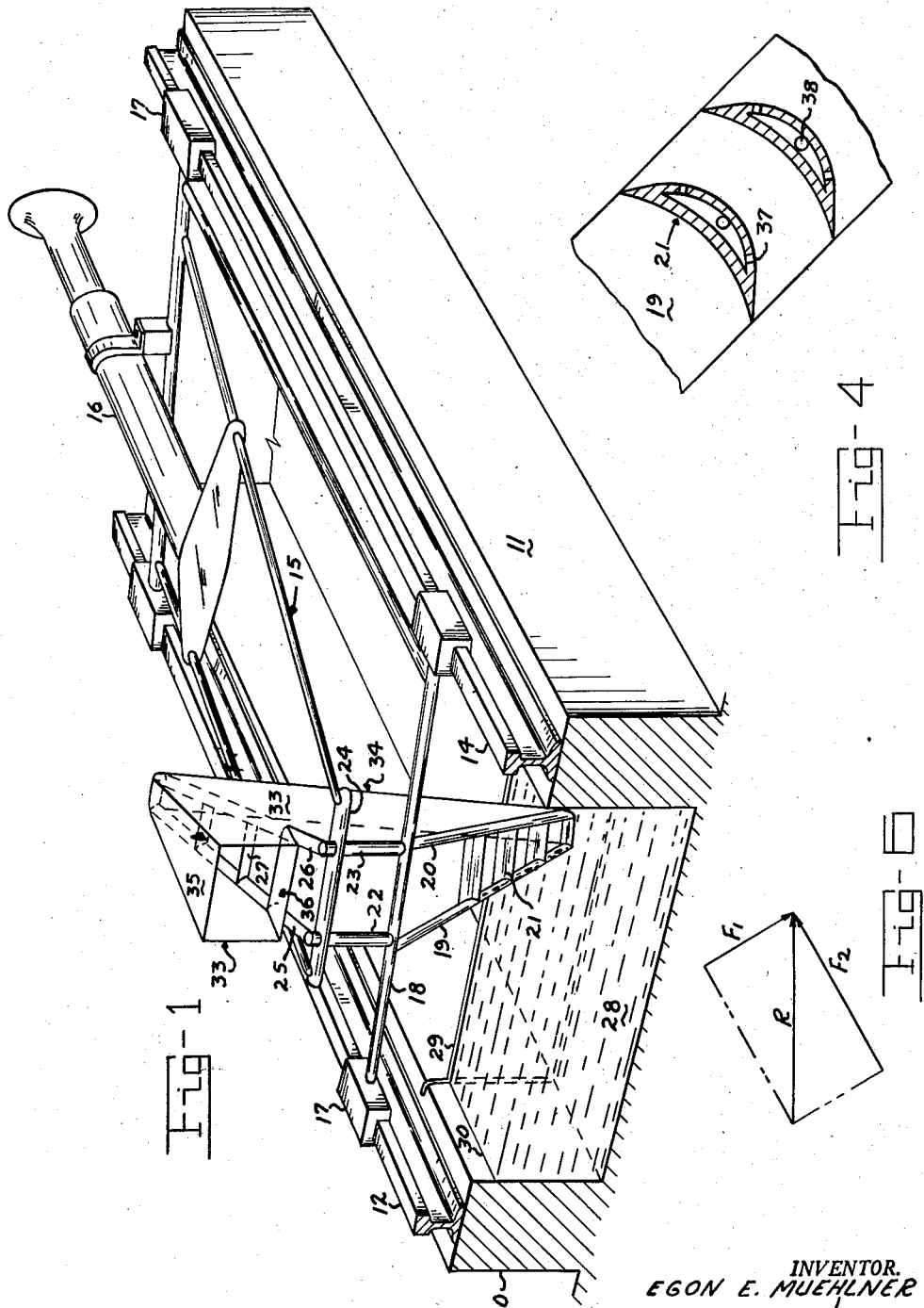
INVENTOR.
EGON E. MUEHLNER
BY
ATTORNEYS

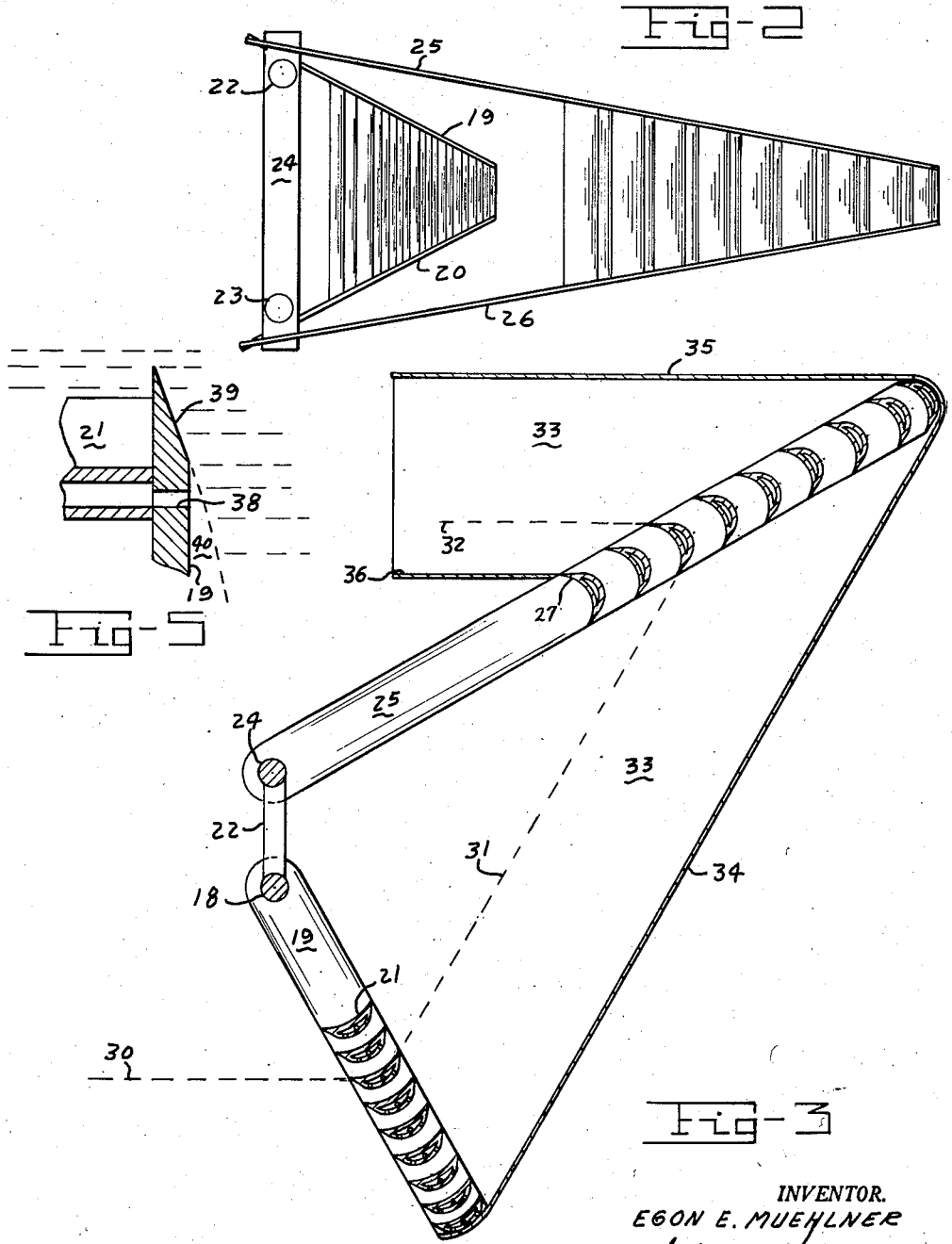

United States Patent Office 2,844,220
Patented July 22, 1958

2,844,220

BLADED BRAKING APPARATUS

Egon E. Muehlner, San Diego, Calif., assignor to the United States of America as represented by the Secretary of the United States Air Force Application December 6, 1955, Serial No. 551,480

14 Claims. (Cl. 188—38)

(Granted under Title 35, U. S. Code (1952), sec. 266)

The invention described herein may be manufactured and used by or for the United States Government for governmental purposes without payment to me of any royalty thereon.

This invention relates to a liquid braking apparatus and, more particularly, to a blade device for braking high speed vehicles by deflecting scooped liquid.

In the use of high speed vehicles, such as rocket driven carriages gliding on tracks carrying aerodynamic test models and personnel, it is desired to stop such vehicles rapidly and smoothly. One method of braking these high speed vehicles is by deflecting liquid such as water from a reservoir or trough by a scoop. The braking force depends on the depth to which the scoop impinges the liquid in the reservoir, the direction in which the liquid is deflected by the scoop, and the instantaneous speed of the vehicle. Thus, the braking force increases as the depth of impingement of the scoop increases. The exact height of the water in the reservoir is varied by changing the height of a dam or partition, which forms the reservoir. It will be understood that a plurality of reservoirs may be formed next to each other with each being of a varying depth so that a predetermined rate of deceleration may be achieved, if desired. Another factor that determines the braking force is the direction in which the liquid is deflected. Thus, if the liquid is deflected in the direction in which the high speed vehicle is moving, the greatest braking force is achieved since this deflecting force is directly opposite to the force moving the water. Obviously, the altering of the direction of the deflected liquid changes the braking force.

One scoop design presently employed consists of a hollow bow or semicircular type device having any kind of cross section such as triangular or rectangular, for example. Due to its curvature, the hollow bow type scoop is stiff and withstands high pressure forces resulting from the liquid passing therethrough only if made excessively heavy. This is due to several causes including the fact that the liquid passing through the curved channel of triangular or rectangular cross section, for example, produces a centrifugal force resulting in very heavy forces on the side walls of the scoop. These forces on the side walls are practically of no value to the braking force so that making the side walls sufficiently thick to withstand them is not desirable. Another detriment of the hollow bow scoop is that its shape prohibits a precise stress computation; thus, a high safety factor is necessary and this, of course, results in greater weight. Another reason for the excessive weight of the scoop is that various parts must be thick in order to make the scoop stiff even though these parts are not required to withstand a strong force from the liquid.

Since the high speed vehicles employed in modern aerodynamic tests require high rates of acceleration and deceleration, it will be readily noted that a heavy scoop is undesirable. This is due to the reason that high accelerations result from light weight vehicles while the hollow bow type scoop must be extremely heavy to produce a high rate of deceleration. This results in a decided disadvantage for this type scoop since increased weight of the scoop requires more power for acceleration but the increased weight requires again a heavier scoop to produce a high rate of deceleration so that no compromise is available.

Accordingly, the present invention overcomes the disadvantages of the hollow bow type scoop as regards the high rate of acceleration while permitting the desired high rate of deceleration. This is accomplished by deflecting the liquid by a plurality of small blades similar to those used in a turbine. These blades are supported by two straight members extending obliquely from the vehicle. Since these straight members are subject only to tension stress, this stress can be easily and accurately computed so that a high safety factor is not required whereby a scoop of lighter weight results. The exact requisites of the blades can also be computed since they are subject only to bending. This again reduces the weight.

An object of this invention is to provide a light weight device for attachment to a high speed vehicle to serve as a rapid stopping apparatus.

Another object of this invention is to provide a liquid braking apparatus for rapidly stopping a high speed vehicle.

Other objects of this invention will be readily perceived from the following description.

This invention relates to a vehicle moving in a predetermined path with suitable means for moving the vehicle. Blade means are mounted on the vehicle and extend in a direction from the vehicle to pass through a liquid reservoir adjacent the path of the vehicle to retard movement of the vehicle when the vehicle follows its path.

The attached drawings illustrate a preferred embodiment of the invention, in which—

Fig. 1 is a schematic perspective view of a vehicle embodying the present invention;

Fig. 2 is a horizontal plan view of a portion of the present invention;

Fig. 3 is a sectional view of a portion of the present invention;

Fig. 4 is an enlarged sectional view of a portion of the apparatus shown in Fig. 3;

Fig. 5 is a sectional view of a portion of the apparatus of Fig. 3, and

Fig. 6 is a schematic diagram of the forces produced by the apparatus of Fig. 3.

Referring to the drawings and particularly Fig. 1, there is shown a pair of supporting walls 10 and 11 having guide rails or tracks 12 and 14 on the top thereof, respectively. A vehicle 15 such as a carriage is moved along the tracks, which provide a predetermined path, by suitable means such as a driving rocket 16. The high speed vehicle 15 has a plurality of guide members 17, which slide along the tracks 12 and 14. A rod member 18 connects the forward guide members together.

A pair of spaced support members 19 and 20 are secured to the rod member 18 by suitable means. These members extend from the rod member 18 at an angle, as clearly shown in Fig. 3. A plurality of blades 21 are disposed between the members 19 and 20 and supported thereby. The blades may be secured to the members by suitable means such as welding, for example.

Referring to Fig. 2, it will be seen that the elongated stress members 19 and 20 converge toward each other at their outer ends. While the members 19 and 20 are shown as converging toward each other, it will be understood that the members could be parallel or diverging, if desired. A pair of stud members 22 and 23, which extend upwardly from the rod member 18, are connected adjacent their top portions by a rod member 24 to form a support structure. A pair of spaced support members 25 and 26 extend from the rod member 24 and are connected thereto by any suitable means. These members extend from the vehicle 15 at an angle and in the disclosed embodiment (see Fig. 3) the members 25 and 26 are perpendicular to the members 19 and 20. A plurality of blades 27 is disposed between the members 25 and 26 and are supported thereby. The blades 27 are secured to the members 25 and 26 by suitable means such as welding. It will be observed from Fig. 2 that the members 25 and 26 converge toward each other at their outer end but these members could be parallel or diverging, if desired.

Between the two supporting walls 10 and 11, a reservoir 28 is formed by partitions or dams 29 (one of which is shown) extending between the supporting walls 10 and 11. The dam 29 may be formed of a material such as Masonite or cardboard, for example, that may be collapsed when the blades 21 and their support members pass therethrough. While only one reservoir has been shown, it will be understood that a plurality of reservoirs of varying heights may be employed, if desired, to provide a predetermined pattern of deceleration rate. However, it will be understood that one reservoir is sufficient to stop the vehicle 15. The level 30 of the liquid, which is preferably water, in the reservoir 28 is shown extending over several blades 21 of Fig. 3. When the blades 21 pass through the reservoir 28, the liquid passes between the blades and is directed toward the blades 27 along a plane indicated by the line 31 in Fig. 3. The liquid produces a force in the direction of the support members 19 and 20; this force is indicated as $F_1$ in Fig. 6. As the liquid is deflected along the plane indicated by the line 31, it next contacts the blades 27 to exert a force on the members 25 and 26; this force being indicated as $F_2$ in Fig. 6. The blades 27 are curved so that the liquid is directed along a horizontal plane indicated by the line 32 as it leaves the blades 27.

As clearly disclosed in Fig. 6, the forces $F_1$ and $F_2$ produce a resultant force R that is in exactly the opposite direction of the movement of the vehicle 15. While the resultant force is shown in exactly the opposite direction of the movement of the vehicle 15, it will be understood that the angle between the members 19 and 20 and the members 25 and 26 may be varied from the 90° relationship, shown in Fig. 3, to change the direction of the resultant force R. The point of action of the resultant force R may be varied by changing the distance between the blades 21 and the blades 27 so that the resultant force R can be shifted up or down, preferably in order to make it pass through the center of gravity of the vehicle 15. Thus, it will be seen that the braking or retarding force on the high speed vehicle 15 as well as the direction and the point of action of this force may be varied as desired by changing the angle relationship between the supporting members or the distance between the sets of blades or the depth of the reservoir.

During the deflection of the liquid from the blades 21 to the blades 27, some spray results therefrom whereby other parts of the vehicle may be wetted down. In order to prevent this spray on the other parts of the vehicle, a housing may be secured to the outer edges of the support members 19 and 20 and the support members 25 and 26 by suitable means such as welding, for example. The housing has a pair of side walls 33 extending between the members 20 and 26 and the members 19 and 25. The housing includes a back wall 34 parallel to the plane 31 along which the liquid is deflected by the upper edge of the blades 21. A portion 35 of the housing forms an outlet duct together with the side walls 33. This duct part of the housing is parallel to the plane 32 along which the liquid is deflected by the upper edge of the blades 27. At the lower side, this duct part is formed by a portion 36, which is fastened to the lowermost one of the blades 27. By forming the portions 33 through 36 of the housing parallel to the flow of the liquid, the housing theoretically is subject to no forces, so the housing may be made very light and thus adds only a negligible weight to the vehicle.

As the liquid flows between the blades 21, large centrifugal forces are created due to the high speed of the vehicle 15 so that the flow of liquid separates from the rear surface of the blades 21 to produce a condition known as cavitation. Cavitation is an unstable state in which bubbles of liquid continuously form and then collapse with great momentum. Such a condition is undesirable since it not only reduces the life of the blades but also creates a restriction to the flow and an uncertainty as to the cross-sectional area occupied by the deflected liquid. In order to prevent cavitation, air is introduced into the channels between the blades and passes through rows of apertures 37 (see Fig. 4). One or more apertures are provided in each row and one or more rows (two are shown) may be employed as required to eliminate cavitation. The air, which flows through the apertures 37, causes the liquid flow to attain a free surface whereby the spaces emptied of the liquid at the rear surface of the blades are filled. The air is introduced into the interior of each of the blades 21 through an opening 38 in the support member 19 (see Fig. 5). While only the member 19 is shown as having the openings 38 therein, it will be understood that the support member 20 may also have an opening providing communication from the exterior of the support member to the interior of each blade 21 depending on the amount of air required. Due to the members 19 and 20 being mounted obliquely with respect to the vehicle 15, a portion of the members 19 and 20 also extend above the level 30 of the liquid in the reservoir 28. The members 19 and 20 have a beveled edge 39 at the front portion thereof to permit the members 19 and 20 to pass easily through the liquid. The beveled edge 39 insures that an air filled space 40 is always provided along the exterior surface of the members 19 and 20 because of the speed at which the members pass through the liquid. Since the members 19 and 20 extend above the level 30 of the liquid, the air space 40 always extends above the surface of the liquid to eliminate the probability of space 40 collapsing or filling with liquid. It will also be understood that only a small quantity of air is required to prevent the condition of cavitation and such results from the fast movement of the members 19 and 20 through the reservoir 28.

Considering the operation of the device, the lowermost blades 21 enter the reservoir 28 and deflect the liquid toward the upper blades 27. The deflecting of the liquid by the blades 21 creates a force $F_1$, as previously explained. The deflected liquid hits the upper blades 27 in the direction of the tangent to the lower curved portion of the blades. The deflection of the liquid by the upper blades 27 results in the force $F_2$, as previously explained. The exact direction and amount of the resultant force that produces the braking or retarding force on the vehicle may be varied as desired, as previously explained. The present apparatus provides a device for braking a high speed vehicle with a minimum of parts with each part utilizing its cross section to the highest permissible stress. This, of course, is due to the fact that the support members 19, 20 and 25, 26 are subject only to tension stress, which may be easily calculated so that a high safety factor is unnecessary. It also will be noted that this tension stress results in the support members being joined to the structure of the vehicle 15 without bending. The only force that the blades are subject to is bending but because of the curved shape of the blades, no increased weight is required.

While two rows of blades have been shown in the preferred embodiment, it will be understood that either a single row or more than two rows could be employed, if desired. For example, a single row would be satisfactory if a deflecting angle of less than 180° would produce the desired force. It will be obvious that more than two rows of blades would permit the liquid to be deflected in any desired direction. It also will be understod that the blades 27 could be so designed that the liquid is separated into two symmetrically arranged sprays to direct the liquid to opposite sides of the vehicle, for example. While the reservoir 28 has been shown disposed between the supporting walls 10 and 11, it will be understood that the reservoir could be positioned outside the walls but adjacent thereto if the blades 21 and 27 were mounted so that the blades 21 passed through the reservoir.

An advantage of this invention is that its reduced weight decreases the cost of high speed track testing by lowering the weight of the vehicle. Another advantage of this invention is that is permits a higher rate of acceleration to be employed on these vehicles since for a certain rate of deceleration the weight of the braking or retarding apparatus, and, hence, the weight of the whole vehicle is less.

For purposes of exemplification, a particular embodiment of the invention has been shown and described according to the best present understanding. However, it will be apparent that changes and modifications in the arrangement and construction of the parts thereof may be resorted to without departing from the true spirit and scope of the invention.

I claim:

1. In combination, a vehicle, means for moving said vehicle in a predetermined path, a liquid reservoir adjacent the path, and blade means mounted on said vehicle, said blade means including a blade having a curved cross section, said blade extending transversely to the predetermined path of the vehicle, said blade means extending in a direction from the vehicle to pass the blade through the reservoir to direct the liquid from the reservoir parallel to a plane parallel to the predetermined path of the vehicle and normal to the surface of the liquid in the reservoir to retard the movement of the vehicle when said vehicle follows its path.

2. In combination, a vehicle, means for moving said vehicle in a predetermined path, a liquid reservoir disposed adjacent the path, a pair of spaced members supported by said vehicle and extending from said vehicle, and blades having a curved cross section disposed between said spaced members and supported thereby, said blades being disposed transverse to the predetermined path of the vehicle, at least one of said blades passing through said reservoir when said vehicle follows its path to direct the liquid from the reservoir in a plane parallel to the predetermined path of the vehicle and normal to the surface of the liquid in the reservoir to retard movement of said vehicle.

3. In combination, a vehicle, means for moving said vehicle in a predetermined path, a liquid reservoir disposed adjacent the path, a first pair of spaced members supported by said vehicle and extending from said vehicle, a series of blades disposed between said spaced members and supported thereby, each of said blades having a curved cross section, said blades being disposed transverse to the predetermined path of the vehicle, a second pair of spaced members supported by said vehicle and extending from said vehicle at an angle to said first pair of spaced members, a series of blades disposed between said second pair of spaced members and supported thereby, each of said blades having a curved cross section, said second series of blades being disposed transversely to the predetermined path of the vehicle, said first series of blades and said second series of blades cooperating to direct the liquid from the reservoir parallel to a plane parallel to the predetermined path of the vehicle and normal to the surface of the liquid in the reservoir to produce a retarding force against movement of said vehicle when at least one of said blades of said first series passes through said reservoir as said vehicle follows its path.

4. The combination according to claim 3 in which a housing is secured to said first and second pairs of spaced members to prevent the liquid passing between the two series of blades from spraying the vehicle.

5. The combination according to claim 2 in which at least one of said spaced members has a plurality of openings therein to provide communication from the exterior thereof to the interior of each of said blades to direct air into the interior of each blade during movement of the members and blades through the liquid reservoir, and each of said blades having at least one aperture in the rear surface thereof to permit air to flow from the interior of the blade to prevent cavitation adjacent the rear surface of the blade.

6. The combination according to claim 1 including means for varying the height of said liquid in said reservoir to vary the rate of retarding movement of said vehicle.

7. In combination, a pair of tracks, a vehicle, means for moving said vehicle along said tracks, a liquid reservoir disposed adjacent said tracks, and blade means mounted on said vehicle, said blade means including a blade having a curved cross section and extending transverse to the tracks, said blade extending into the reservoir when said vehicle moves along said tracks to direct the liquid from the reservoir parallel to a plane parallel to the tracks and normal to the upper surfaces of the tracks to retard the movement of said vehicle.

8. In combination, a pair of tracks, a vehicle, means for moving said vehicle along said tracks, a liquid reservoir disposed between said tracks, and blade means mounted on said vehicle, said blade means including a blade having a curved cross section and extending transverse to the tracks, said blade extending into said reservoir when said vehicle passes over said reservoir to direct the liquid from the reservoir parallel to the plane parallel to the tracks and normal to the upper surfaces of the tracks to retard the movement of said vehicle.

9. The combination according to claim 7 including means for varying the height of said liquid in said reservoir to vary the rate of retarding movement of said vehicle.

10. In combination, a pair of tracks, a vehicle, means for moving said vehicle along said tracks, a liquid reservoir disposed adjacent said tracks, a pair of spaced members extending from said vehicle, and blades disposed between said members and supported thereby, each of said blades having a curved cross section, said blades being disposed transverse to the tracks, at least one of said blades extending into the liquid reservoir when the vehicle moves along said tracks to direct the liquid from the reservoir parallel to a plane parallel to the tracks and normal to the upper surfaces of the tracks to retard movement of the vehicle.

11. In combination, a pair of tracks, a vehicle, means for moving said vehicle along said tracks, a liquid reservoir disposed between said tracks, a pair of spaced members extending from said vehicle, and blades disposed between said members and supported thereby, each of said blades having a curved cross section, said blades being disposed transverse to the tracks, at least one of said blades extending into the liquid reservoir when the vehicle passes over the reservoir to direct the liquid from the reservoir parallel to a plane parallel to the tracks and normal to the upper surfaces of the tracks to retard movement of the vehicle.

12. A deceleration device for high speed vehicles designed for travel along track means having a liquid deceleration reservoir disposed adjacent to and parallel with the direction of said track means and adapted to contain a deceleration liquid: comprising a carriage adapted to travel on said track means, propelling means for moving said carriage along said track means, a pair of blade supporting stress members connected to said carriage above the track means and depending from the carriage in laterally spaced relation to the direction of the travel of the carriage, said members inclining downwardly and rearwardly relative to the direction of travel of the carriage with their outer end portions disposed to travel through the deceleration liquid below the surface thereof during movement of the carriage along said track means, an elongated deceleration blade member having a curved cross section and connected between the adjacent sides of said spaced stress members adjacent said outer end portions for travel below the surface of said deceleration liquid, said blade member being disposed transverse to the direction of the travel of the carriage and curved to deflect the deceleration liquid out of the reservoir tangentially to the curvature of the blade member 13. A deceleration device for high speed vehicles designed for travel along track means having a liquid deceleration reservoir disposed adjacent to and parallel with the direction of said track means and adapted to contain a deceleration liquid: comprising a carriage adapted to travel on said track means, propelling means for moving said carriage along said track means, a pair of blade supporting stress members connected to said carriage above the track means and depending therefrom in laterally spaced relation to the direction of the travel of the carriage, said members inclining downwardly and rearwardly relative to the direction of travel of the carriage with their outer end portions disposed to travel through the deceleration liquid below the surface thereof during movement of the carriage along said track means, a plurality of elongated deceleration blade members connected between the adjacent sides of said spaced stress members adjacent said outer end portions for travel below the surface of said deceleration liquid, each of said blade members having a curved cross section, each of said blade members being disposed transverse to the direction of the travel of the carriage and curved to deflect the deceleration liquid out of the reservoir tangentially to the curvature of the blade member.

14. A deceleration device for a high speed vehicle designed for travel along track means having a liquid deceleration reservoir disposed adjacent to and parallel with the direction of the track means and adapted to contain a deceleration liquid, the deceleration device comprising a carriage adapted to travel on the track means, propelling means for moving the carriage along the track means, a first pair of spaced members supported by said carriage and extending from said carriage, said first pair of members inclining downwardly and rearwardly relative to the direction of travel of the carriage with their outer end portions disposed to travel through the deceleration liquid and below the surface thereof during movement of the carriage along said track means, a blade having a curved cross section disposed between the spaced members and supported thereby, said blade being disposed transverse to the direction of travel of the carriage, a second pair of spaced members supported by said carriage and extending from said carriage at an angle to said first pair of spaced members, said second pair of members inclined upwardly and rearwardly relative to the direction of travel of the carriage, and a blade having a curved cross section disposed between said second pair of spaced members and supported thereby, said blade disposed between said second pair of spaced members being transverse to the direction of travel of the carriage, said first blade and said second blade cooperating to direct the liquid from the reservoir parallel to a plane parallel to the direction of travel of the carriage and normal to the upper surface of the deceleration liquid to produce a retarding force against movement of said carriage when said first blade passes through said reservoir as said carriage travels along said track means.

References Cited in the file of this patent
UNITED STATES PATENTS

| | | |
|---|---|---|
| 2,106,961 | Schmidt | Feb. 1, 1938 |
| 2,724,966 | Northrop et al. | Nov. 29, 1955 |